(12) United States Patent
Gonzales et al.

(10) Patent No.: US 6,718,441 B2
(45) Date of Patent: *Apr. 6, 2004

(54) METHOD TO PREFETCH DATA FROM SYSTEM MEMORY USING A BUS INTERFACE UNIT

(75) Inventors: Mark A. Gonzales, Portland, OR (US); Linda J. Rankin, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/141,231

(22) Filed: May 8, 2002

(65) Prior Publication Data

US 2002/0199079 A1 Dec. 26, 2002

Related U.S. Application Data

(63) Continuation of application No. 08/438,473, filed on May 10, 1995, now Pat. No. 6,453,388, which is a continuation-in-part of application No. 08/287,704, filed on Aug. 9, 1994, now abandoned, which is a continuation of application No. 07/900,142, filed on Jun. 17, 1992, now abandoned.

(51) Int. Cl.[7] .............................................. G06F 13/00
(52) U.S. Cl. ...................................... 711/137; 711/213
(58) Field of Search ................................. 711/137, 213

(56) References Cited

U.S. PATENT DOCUMENTS

| 4,480,307 A | 10/1984 | Budde et al. ................ 710/100 |
| 4,774,654 A | 9/1988 | Pomerene et al. ........... 711/122 |
| 4,807,110 A | 2/1989 | Pomerene et al. ........... 711/213 |
| 4,860,195 A | 8/1989 | Krauskopf ................... 711/202 |
| 5,148,525 A | 9/1992 | Ohga et al. .................. 710/107 |
| 5,261,066 A | 11/1993 | Jouppi et al. ................ 711/122 |
| 5,267,350 A | 11/1993 | Matsabura et al. .......... 712/205 |
| 5,317,718 A | 5/1994 | Jouppi ......................... 711/137 |
| 5,345,560 A | 9/1994 | Miura et al. .................... 711/3 |
| 5,371,870 A | 12/1994 | Goodwin et al. ............ 711/213 |
| 5,499,355 A | 3/1996 | Krishnamohan et al. ..... 711/137 |
| 5,524,221 A | 6/1996 | Sato et al. ................... 712/230 |
| 5,619,663 A | 4/1997 | Mizrahi Shalom et al. . 711/137 |
| 5,752,272 A | 5/1998 | Tanabe ........................ 711/213 |
| 5,761,706 A | 6/1998 | Kessler et al. ............... 711/118 |
| 5,903,911 A | * 5/1999 | Gaskins ....................... 711/137 |
| 6,453,388 B1 | * 9/2002 | Gonzales et al. ............ 711/137 |

OTHER PUBLICATIONS

Norman P. Jouppi "Improving Direct–Mapped Cache Performance by the Addition of a Small Fully Associative Cache & Prefetch Buffers," May 28–31, 1990, pp. 364–373, 17th Annual International Symposium on Computer Architecture, Seattle Washington.

* cited by examiner

*Primary Examiner*—Glenn Gossage
(74) *Attorney, Agent, or Firm*—Blakely, Sokoloff, Taylor & Zafman LLP

(57) ABSTRACT

A method and system to prefetch data from system memory to a central processing unit (CPU). The system includes a dynamic random access memory (DRAM) connected to a high speed bus, a CPU and a bus interface unit that allows the CPU to communicate with the high speed bus. The bus interface unit contains logic circuitry, so that when the CPU generates a read memory access request for information associated with a first address, the interface unit generates a request packet for the information and prefetch information associated with a prefetch address. The bus interface unit creates the request packet by increasing the number of addresses originally requested by the CPU. The interface then sends the request packet to the system memory device, which retrieves and returns the requested data. The interface may include a pair of buffers which store both the information requested by the CPU and speculative or prefetch information. When the CPU generates a subsequent request, the interface compares the addresses requested with the addresses in the prefetch buffer. If the buffer contains the addresses, the data is sent to the processor. The prefetch buffer is directly addressable so that any line within the buffer can be retrieved.

6 Claims, 3 Drawing Sheets

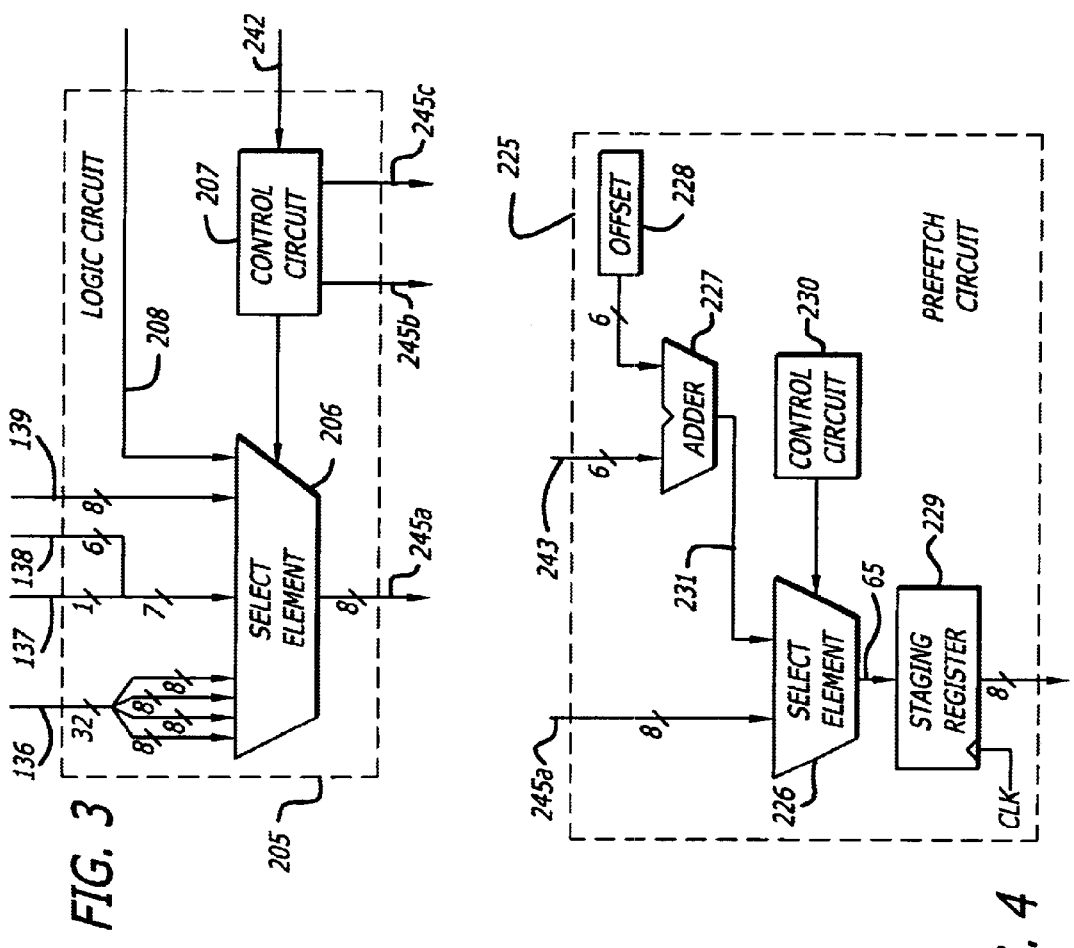
FIG. 3
FIG. 4
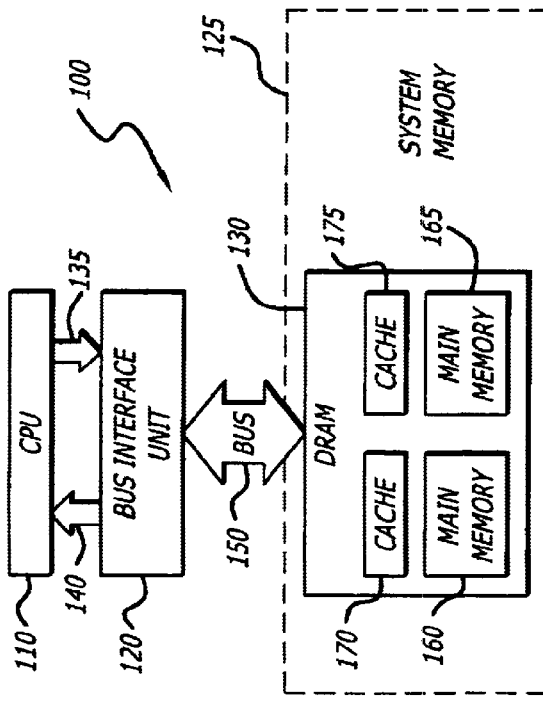
FIG. 1

METHOD TO PREFETCH DATA FROM SYSTEM MEMORY USING A BUS INTERFACE UNIT

CROSS-REFERENCES TO RELATED APPLICATIONS

This is a continuation of a U.S. patent application entitled "Computer System Having a Bus Interface Unit for Prefetching Data From System Memory" (Ser. No. 08/438,473), now U.S. Pat. No. 6,453,388, which is a continuation-in-part of U.S. patent application entitled "Method and Apparatus for Prefetching Data from System Memory to a Central Processing Unit" (Ser. No. 08/287,704), now abandoned, which is a continuation of a U.S. patent application entitled "Method and Apparatus for Prefetching Data from System Memory" (Ser. No. 07/900,142), now abandoned.

BACKGROUND OF THE INVENTION

1. Field of the Invention

The present invention relates to a method and system for reading data from a memory device through a prefetching technique.

2. Description of Related Art

It is commonly known that computer architectures include a microprocessor that reads data from and writes data to system memory which usually includes dynamic random access memory ("DRAM"). DRAM is used in system memory because it provides an inexpensive means of obtaining a large memory space. Typically, a computer system may have a number of DRAM chips, each having a plurality of addressable memory locations.

Many microprocessors read data from system memory in multiple byte blocks. Accessing multiple bytes of data from memory is usually slower than the speed of the processor, causing the processor to wait for the data. To reduce this access time, some computer architectures incorporate various levels of cache, which provide smaller yet faster blocks of addressable memory. When the processor generates a read request, the request is first sent to a cache. If the processor determines that the cache does not contain the requested data (i.e., a cache miss), the read request is sent to system memory. The data is retrieved from the system memory, and thereafter written to the processor and possibly the cache for subsequent use.

To reduce cache "miss" rates, some computer systems include prefetch algorithms. When the processor reads data, the data associated with the successive addresses is also fetched and stored in the cache. For example, if the processor request addresses A0–A7, addresses A8–A15 will also be fetched from the system. The prefetch algorithm increases the "hit" rate of the subsequent read request from the processor.

Such a prefetch method is disclosed in the publication by Norman J. Jouppi, "IMPROVING DIRECT-MAPPED CACHE PERFORMANCE BY THE ADDITION OF A SMALL FULLY-ASSOCIATIVE CACHE AND PREFETCH BUFFERS", The 17th Annual International Symposium on Computer Architecture, May 28–31, 1990, pages 364–373. The system disclosed by Jouppi teaches the use of a stream buffer between the first level (L1) and second level (L2) caches of the CPU. When there is a cache miss in the L1 cache, the data is fetched from the L2 cache. When fetching from the L2 cache, the system also fetches successive addresses and stores the additional data in the stream buffer. When the CPU generates a subsequent read, the request is supplied to both the L1 cache and the stream buffer. If the stream buffer contains the addresses requested, the data is sent to the processor.

The addition of the stream buffer therefore improves the hit rate without polluting the L1 cache. If neither the stream buffer or L1 cache have the addresses, the data is fetched from the L2 cache along with a prefetch that replaces the data within the stream buffer. The stream buffer of the Jouppi system has a first in first out ("FIFO") queue, so that if the requested data is not in the top line of the buffer, the data cannot be retrieved. The requested data is then fetched from the second level cache. The stream buffer will be flushed and restarted at the missed address.

Although the Jouppi concept improves the internal performance of multilevel cache systems, it does not solve the inherent latency problems between the CPU and system memory. Prefetches have not been desirable between a CPU and system memory because the extra time needed to read the additional data slows down the processor. The increased hit rate would not compensate for the delay in memory reads, thereby resulting in an inefficient system. It would therefore be desirable to have a system that would provide an efficient way of prefetching data from system memory.

SUMMARY OF THE INVENTION

Adapted for a computer system including a central processing unit ("CPU"), system memory and a bus, a bus interface unit is coupled between the CPU and the bus to obtain requested information and prefetch information from the system memory. The bus interface unit receives a first read request for information associated with a first address of system memory. The bus interface unit produces and places a request packet requesting the information and prefetch information associated with speculative addresses onto the bus to be read by system memory. Thereafter, the system memory provides the requested information and the prefetch information to the bus interface unit along the bus. The information is transmitted to the CPU. The prefetch information may be transmitted to the CPU depending on the nature of a subsequent request by the CPU.

BRIEF DESCRIPTION OF THE DRAWINGS

The features and advantages of the present invention will become more readily apparent to those of ordinary skill in the art after reviewing the following detailed description and accompanying drawings, wherein:

FIG. 1 is a block diagram of a computer system including a bus interface unit.

FIG. 3 is a circuit diagram of the logic circuit of the bus interface unit of FIG. 2.

FIG. 4 is a circuit diagram of the prefetch circuit of the bus interface unit of FIG. 2.

DETAILED DESCRIPTION OF THE INVENTION

Figure 2:
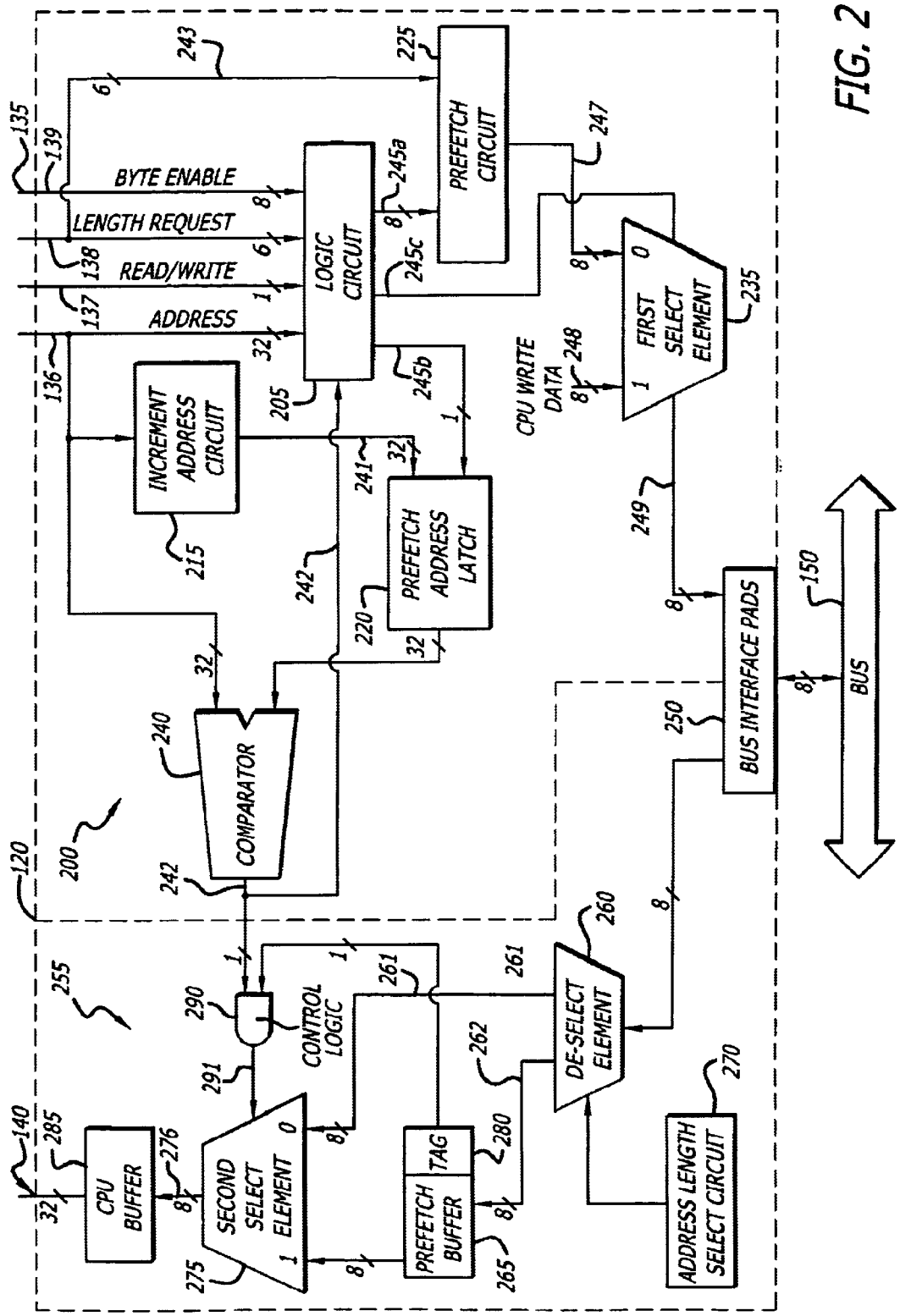
FIG. 2 is a circuit diagram of the bus interface unit of FIG. 1 including a logic circuit and a prefetch circuit.

An apparatus and method for efficiently reading data from system memory through prefetch techniques are described below. In the following description, for purposes of explanation, specific details are set forth in order to provide a thorough understanding of the present invention. However, it should be apparent to a person of ordinary skill in the art of circuit design that the present invention may be practiced without these specific details. In other instances, well known operations, functions and devices are not shown in order to avoid obscuring the present invention. Moreover, a specific example has been created for the sole purpose of illustrating the present invention, but should not be construed as a limitation on the scope of the invention.

In the detailed description, a number of terms are frequently used to describe certain logics and define certain representations herein. For example, a "select element" is defined as one or more multiplexers configured in parallel or cascaded in series to produce a desired output. A "byte" is generally defined as a plurality of information bits (i.e., binary values of address, data or control) transferred in parallel. A "request packet" is defined as a sequence of six one-byte information packets containing address, control and request length information which are transferred in series according to a format defined in "Rambus™™ Product Catalog" (order no. 903010042081) published by Rambus™™, Inc. of Mountain View, Calif.

Referring to the drawings more particularly by reference numbers, FIG. 1 shows a system 100 employing the present invention. The system 100 comprises a central processing unit ("CPU") 110, a bus interface unit 120 and system memory 125 including at least one Dynamic Random Access Memory ("DRAM") device 130. The CPU 110 is coupled to the bus interface unit 120 through a pair of unidirectional buses 135 and 140. The bus interface unit 120 is coupled to the system memory 125 through a bi-directional bus 150 thereby enabling the CPU 110 to communicate with the system memory 125. The bus 150 is configured to support the Rambus™™ protocol.

The CPU 110 is capable of generating read and write memory access requests to the system memory 125. The information transferred includes data and/or instructions, both of which will be generically referred to as "information" unless otherwise distinguished. In general, the CPU 110 generates a read memory access request in sixteen (16) byte bursts corresponding to a byte length of a cache line. However, it is contemplated that bursts can be appropriately altered to correspond with cache lines of 32 or 64 bytes in length. The read memory access requests includes addresses that are to be read from system memory 125.

System memory 125 preferably comprises at least one DRAM device manufactured, for example, by Rambus™, Inc. of Mountain View, Calif. Each DRAM preferably includes two blocks of main memory 160 and 165, each block including a 36×256×256 array of memory cells wherein four (4) bits of the 36 bit-wide block are used for parity. Each block 160 and 165 operates in conjunction with its dedicated cache 170 and 175 having a cache line of sixteen (16) bytes and storing approximately one kilobyte ("Kbyte") of information. Preferably, the bus 150 is one byte wide such that information is serially transferred one byte at a time. The data transfer rate on the bus 150 is preferably on the order of 500 megabytes/sec which translates into a clock "CLK" rate of 2 nanoseconds.

Referring now to FIG. 2, an illustrative embodiment of the bus interface unit 120 is shown. The bus interface unit 120 comprises a transmitting sub-unit 200 that converts a read or write memory access request from the CPU into a request packet comprised of a sequence of one-byte information packets formatted according to the Rambus™ protocol. The bus interface unit 120 further includes a receiving sub-unit 255 that reconverts bytes of information from the system memory 125 into a format configured for the CPU. The transmitting sub-unit 200 includes a logic circuit 205, an increment address circuit 215, a prefetch address latch 220, a prefetch circuit 225, a first select element 235 and a comparator 240.

The CPU is coupled to the logic circuit 205 through the uni-directional bus 135 which includes address lines 136, a read/write line 137, length request lines 138 and byte enable lines 139. The address lines 136 are illustrated to be 32-bits wide to support a four gigabyte address space while the read/write line 137, length request lines 138 and byte enable lines 139 are represented as having bit widths of one, six and eight bits, respectively. It is contemplated that such bit widths are chosen for illustrative purposes and may be varied accordingly.

The address lines 136 are used for transferring an address of information requested by the CPU ("request information") to be read from or written to system memory. For clarity sake, this address is referred to as the "first address". The address lines 136 are further coupled to both the increment address circuit 215 and the comparator 240. The address lines 136 are coupled to the increment address circuit 215 in order to produce a speculative address by incrementing the first address on the address lines 136. Thereafter, the speculative address is transferred via address lines 241 to the prefetch address latch 220 and temporarily stored therein upon assertion of an enable signal via enable line 245b. The speculative address is used in determining whether information associated with a subsequent CPU request has already been "prefetched" and stored in the prefetch address latch 220 as discussed below.

In addition, the read/write line 137 is used to signal whether the CPU desires to read information from or write information into system memory. The length request lines 138 are used to indicate the amount of information requested by the CPU (preferably at least one byte), while the byte enable lines 139 are used to indicate the number of bytes to be written to a selected address location in system memory.

Referring now to FIG. 3, the logic circuit 205 operates as a parallel-to-byte serial converter which receives information bits of the read or write memory access request from the CPU via lines 136–139 and serially transfers the sequence of one-byte information packets into the prefetch circuit 225 through lines 245a (see FIGS. 2 and 4). Collectively, these information packets include, but are not limited to, the address requested by the CPU, a number of bytes requested (length or byte enable) and control information indicating the type of transaction (read or write).

The serial transmission of the information packets is controlled by appropriately routing the information bits into a select element 206 and selectively outputting a byte at a time under direction of a well-known control circuit 207 operating in accordance with the Rambus™ protocol. The control circuit 207 generally allows the serial single-byte transmission of the information packets except, if the control circuit detects, during a read memory access request, that the first address is identical to the speculative address. Such detection is accomplished by monitoring whether an output line 242 from the comparator is asserted (logic "1") or not. If the output line is asserted, the select element 206 is disabled from transmitting the information packets to the prefetch circuit 225 but rather uses information previously stored in a prefetch buffer 265 of the receiving sub-unit 255 (see FIG. 2). If the output line 242 is not asserted, indicating no match, the logic circuit asserts the enable line 245b to allow the speculative address to be stored in the prefetch address latch 220 (see FIG. 2).

In the event that the first address is not equal to the speculative address, the prefetch circuit 225 receives information packets. As shown in FIG. 4, the prefetch circuit 225 comprises a select element 226, an adder 227, an offset storage element 228, a staging register 229 and control circuit 230. The select element 226 receives the sequence of information packets from the logic circuit 205 and one information packet from the adder 227 through signal lines 231. This information packet from the adder 227 is the sum of the (i) length request information provided by lines 243, which are coupled to the length request lines 138, and (ii) an offset from the offset storage element 228. The offset is a binary representation equal to the number of bytes of "prefetch information" requested in addition to the request information. The prefetch information is typically equal to a cache line in size (sixteen bytes for this illustrative embodiment). Thus, the system memory provides more information than requested by the CPU.

During a cache line read request, the prefetch circuit 225 monitors the sequence of information packets for the length request information and upon detecting the length request information, the control circuit 230 selects the output of the adder 227 to increase the number of bytes of information retrieved from system memory before the addresses are sent to system memory. The information packets propagate in series through the select element 226 and into the staging register 229 clocked at CLK. The staging register 229 is merely used for timing purposes for transmission to the first select element 235 (see FIG. 2) via lines 247.

For example, if the CPU issues a read request for a cache line of sixteen bytes addressed by A0–A15, the prefetch circuit 225 will alter the length request to reflect two cache lines addressable by A0–A31. The bus interface unit 120 would then send the read request to system memory requesting information associated with the addresses A0–A31 which would be subsequently transferred from system memory to the bus interface unit 120. The prefetch circuit 225 may also contain logic to ensure that the speculative addresses do not extend into a different DRAM. Depending upon the characteristics of the CPU, the prefetch circuit 225 may generate an additional request instead of changing the addresses requested.

Referring back to FIG. 2, the first select element 235 receives as a first input information packets from the prefetch circuit 225 and data directly from the CPU via data lines 248 as a second input. The first select element 235 is controlled by the logic circuit 205 via select line 245c. For a read memory access request, the logic circuit 205 only selects the information packets from the prefetch circuit 225 to be propagated from the first input of the first select element 235, along output lines 249 and onto bus interface pads 250 for later transmission through the bus 150. However, for a write memory access request, the logic circuit 205 first selects the first select element 235 to propagate the information packets to the bus interface pads 250 and, after completing the write memory access request, the logic circuit 205 selects the first select element 235 to propagate write data from data lines 248 to the bus interface pads 250.

Referring back to FIG. 1, when the CPU generates a read memory access request, the bus interface unit 120 takes the addresses requested and generates and transmits the request packet onto the bus 150. Each DRAM of the system memory 125 monitors the bus 150. The addresses are compared with the addresses stored in one of the caches 170 and 175. If the cache contains the requested information addressed at the first address, the DRAM 130 provides an asserted acknowledge signal to the bus interface unit 120 and transmits the information onto the bus 150, byte by byte. If the requested information is not within cache, the DRAM 130 transmits a negative acknowledge signal to the bus interface unit 120 and performs an internal cache fetch. The internal cache fetch transfers the requested information from main memory 160 or 165 into its cache 170 or 175, respectively. The bus interface unit 120 then resubmits a read memory access request into the bus 150. The DRAM 130 now has the requested information in cache, which is then transmitted to the bus interface unit 120. Because most CPU's cannot retrieve information byte by byte every 2 nanoseconds, the bus interface unit 120 has a CPU buffer 285 (FIG. 2) that stores the data from the bus for subsequent retrieval by the CPU. The CPU buffer 285 converts bytes from a second select element 275 into 32-bit parallel data for the CPU.

Referring again to FIG. 2, the receiving sub-unit 255 of the bus interface unit 120 comprises a de-select element 260, a prefetch buffer 265, an address length select circuit 270, the second select element 275, a tag element 280, the CPU buffer 285 and control logic 290. The de-select element 260 is controlled by the address select circuit 270 to transfer the information from the bus 150 to either the prefetch buffer 265 or the second select element 275. The address length select circuit 270 stores the number of bytes requested by the CPU through the length request line 138 and counts each byte of information received from system memory through the bus 150. Thus, continuing the above-described example, the request information (information from A0–A15) would be routed to the second select element 275 via signal lines 261 while the prefetch information (information from A16–A31) would be alternatively routed for storage in the prefetch buffer 265 via signal lines 262.

In order to increase the operational speed of the system, the bus interface unit 120 is configured to include the comparator 240 which checks whether the CPU 110 is issuing a read memory access request for information that has been already been prefetched by a prior read memory access request. This is done by comparing the address of the current read memory access request to the speculative address stored in the prefetch address latch 220 and provided to the comparator 240. If the tag element 280 is set, indicating that the prefetch buffer 265 is storing valid prefetch information, the control logic 290 selects the second select element 275 so that the prefetch information is transferred from the prefetch buffer 265 to the CPU buffer 285 through signal lines 266 and 276. Moreover, the logic circuit 205 is disabled through signal line 242 since no information needs to be retrieved from system memory. However, if the addresses are not equal, the process continues as described above.

More specifically, using the specific example described above for illustrative purposes, for a read memory access request, the request information associated with A0–A15 is input into the second select element 275 via lines 261. Since the tag element 280 is initially cleared, the output from the control logic 290 selects the second select element 275 to transmit the request information to the CPU buffer 285 for conversion to parallel data. Thereafter, the prefetch information associated with A16–A31 is stored in the prefetch buffer 265 causing the tag element 280 to be set.

Upon the CPU issuing another request, for example a read memory access request, the comparator circuit 240 compares the address produced by the read memory access request with the speculative address stored in the prefetch address latch 220. If these addresses are identical, the comparator 240 asserts the signal line 242 which disables the logic circuit 205 to prevent it from transferring information to the prefetch circuit 225 and propagates a logic "1" to a first input of the control logic 290. Since the tag element 280 is set from the prior read memory access request, the control logic 290 asserts its select lines 291 to allow the prefetch information from the prefetch buffer 265 to be transmitted to the CPU buffer 285. If there is a write request to an address which has previously been prefetched and is stored in the prefetch buffer 265, the tag element 280 is cleared and the information is overwritten or cleared.

Figure 5:
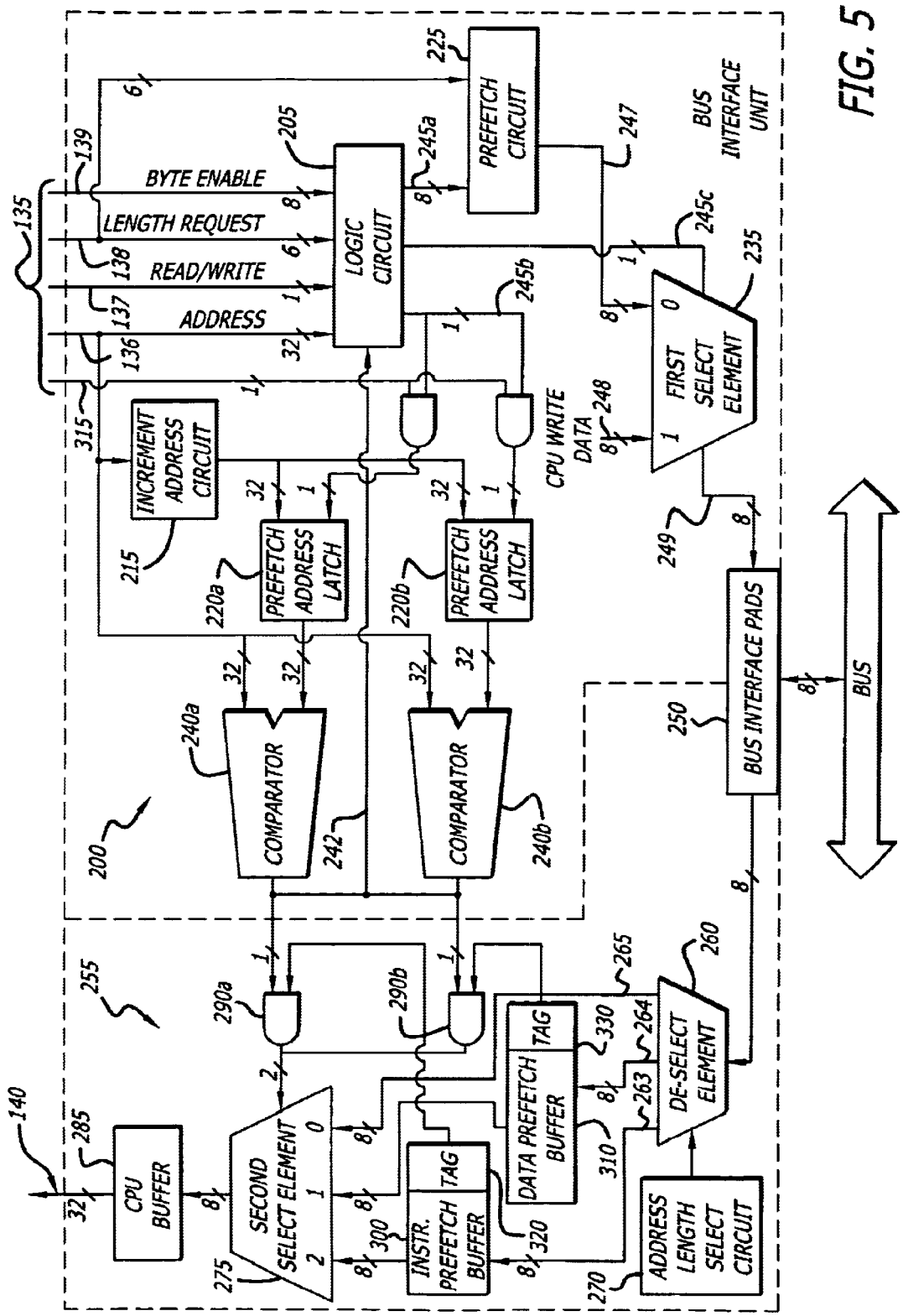
FIG. 5 is a schematic of an alternate embodiment of the bus interface unit.

Referring now to FIG. 5, a second illustrative embodiment of the bus interface unit 120 may include a plurality of prefetch buffers 300 and 310 in which one of these prefetch buffers (i.e., the instruction prefetch buffer 300) is configured to store instructions while the other prefetch buffer (i.e., the data prefetch buffer 310) is used to store data. It is contemplated, however, that multiple data or instruction prefetch buffers may be employed simultaneously by altering the bus interface unit 120 in a manner similar to that described below.

The isolation of the instruction prefetch buffer 300 from the data prefetch buffer 310 allows one type of information to be retrieved by the CPU without purging the prefetch buffer for the other type. This increases the "hit" rate within the prefetch buffers 300 and 310. Computer programs will typically run with consecutive lines of instruction or data. The successive lines can be interrupted with a request for data or instruction. Such an interruption can degrade the performance of the speculative prefetch. For example, in a system with one prefetch buffer (as shown in FIG. 2), the CPU may first request an instruction, wherein a prefetched instruction is stored in the prefetch buffer. The CPU may then request data, which is not in the prefetch buffer and must be retrieved from memory. The bus interface unit 120 would prefetch the data and overwrite the prefetched instructions with the data. If the CPU subsequently requests instructions, the CPU request must be retrieved from memory because the prefetch buffer now contains data. With the dual buffer system as shown in FIG. 5, the original speculative instructions will still exist prefetch buffer 300, when the CPU generates the subsequent instruction request.

In order to configure the bus interface unit 120 to support the plurality of buffers 300 and 310, additional logic circuitry must be duplicated to operate in parallel. As shown, for two prefetch buffers 300 and 310, the transmitting sub-unit 200 is altered to include two prefetch address latches 220a and 220b and two comparators 240a and 240b operating in parallel. The prefetch address latches 220a and 220b are enabled by logically ANDing an enable signal from the logic circuit 205, asserted as discussed in reference to FIG. 2 and a CPU INSTRUCTION/DATA control signal from the CPU via control line 315 to indicate whether the CPU request is for instructions or data.

In addition, the receiving sub-unit 255 is altered by including the two prefetch buffers 300 and 310 with corresponding tag elements 320 and 330, respectively. Moreover, the de-select element 260 includes output lines 263–265 which are inputs for the prefetch instruction buffer 300, the prefetch data buffer 310 and the second select element 275, respectively. Moreover, the de-select element 260 is required initially to transmit request information into the second select element 275 and transmit the prefetch instruction or prefetch data to the instruction prefetch buffer or data prefetch buffer 310, respectively.

While certain exemplary embodiments have been described in detail and shown in the accompanying drawings, it is to be understood that such embodiments are merely illustrative of and not restrictive on the present invention and that the invention is not limited to the specific arrangements and constructions shown and described, since various other modifications may occur to those ordinarily skilled in the art.

What is claimed is:

1. A method comprising:

formatting a first memory access from a central processing unit for a first information associated with a first address into a request packet;

altering at least one information packet of the request packet so that the request packet requests the first information and a second information being prefetch information associated with a speculative address;

incrementing the first address to produce the speculative address;

temporarily storing at least the first information in an output buffer before transferring the first information to the central processing unit;

storing the second information in at least one input buffer;

outputting one of the first information and the second information to the output buffer by a select element;

receiving in series the first information and the second information; and outputting the first information to the select element and outputting the second information to the at least one input buffer by a de-select element using an address select circuit.

2. The method of claim 1 further comprising:

outputting the prefetch information using a control logic circuit if a second memory access request, immediately subsequent to the first memory access request, requests information associated with the speculative address.

3. The method of claim 1 wherein formatting comprises:

formatting the first memory access being one of a read access and a write access.

4. The method of claim 1 wherein altering comprises:

altering the at least one information packet including at least one of a length request information and an offset representing size of the prefetch information.

5. The method of claim 1 further comprising:

comparing the first address with the speculative address; and transferring the prefetch information to a processor buffer if the first address and the speculative address match and the prefetch information is valid.

6. The method of claim 1 wherein receiving in series the first information and the second information comprises:

receiving the first information and the second information from a parallel-to-serial converter.

* * * * *